June 17, 1930.   R. W. GRACE   1,764,016

TESTING JACK AND PLUG

Filed Sept. 8, 1928

Inventor
R. W. Grace
By Harry Grease
Attorney

Patented June 17, 1930

1,764,016

UNITED STATES PATENT OFFICE

RICHARD W. GRACE, OF CANTON, OHIO, ASSIGNOR TO THE SUPERIOR SWITCHBOARD & DEVICES COMPANY, OF CANTON, OHIO, A CORPORATION OF OHIO

TESTING JACK AND PLUG

Application filed September 8, 1928. Serial No. 304,783.

The invention relates to testing jacks and plugs for the testing of electrical meters and the like.

The object of the improvement is to provide a jack upon a switch to a meter and the like and adapted to be engaged by a testing plug, the device being so arranged that a testing meter or the like associated with the plug may be connected to the jack for testing the meter without in any way disturbing the current to the meter, thus providing for testing of a meter without inconveniencing the customer or user.

Figure 1:
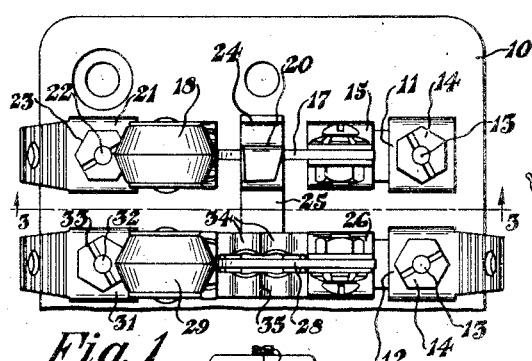
Figure 2:
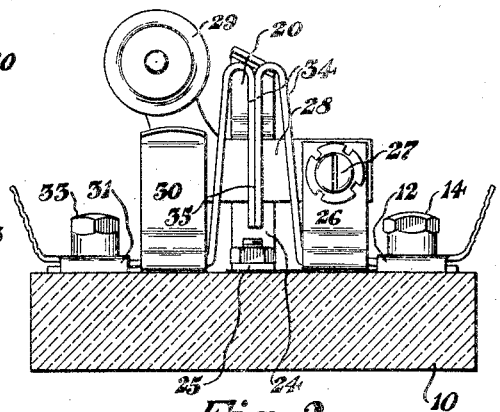
Figure 4:
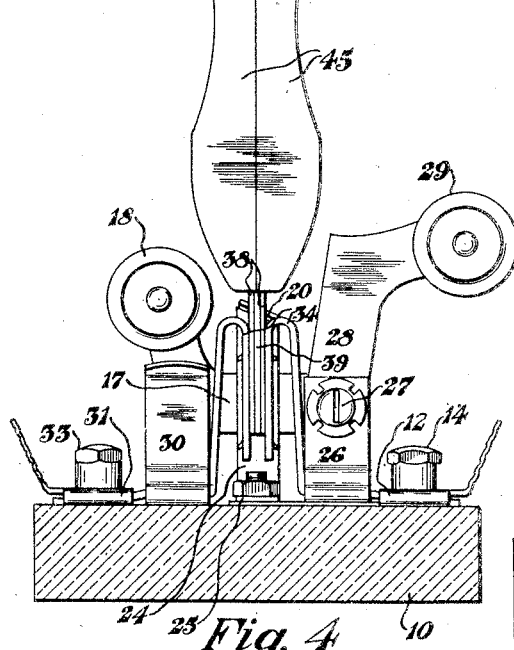
Figure 7:
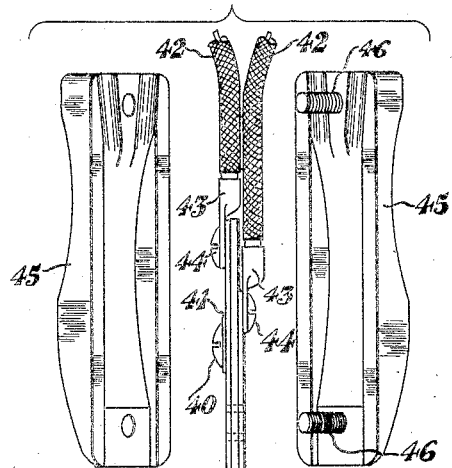
Figure 3:
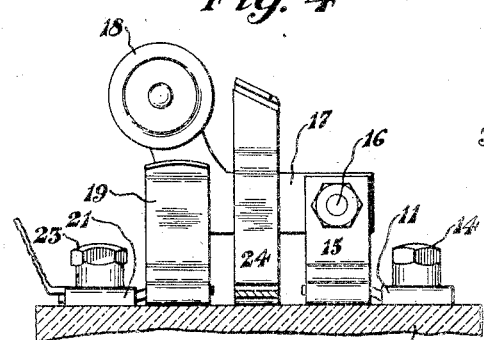
Figures 5, 6:
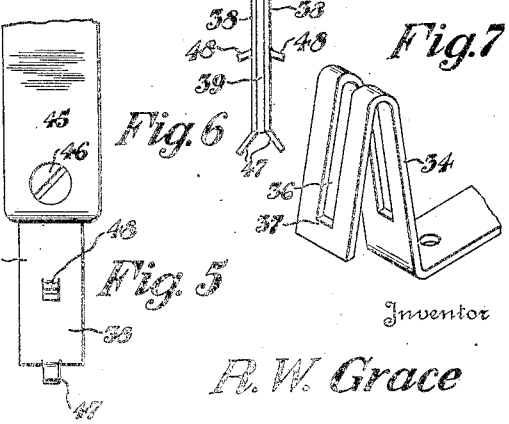

An embodiment of the invention is illustrated in the accompanying drawing, in which Figure 1 is a plan view of a switch provided with the improved jack showing the parts in normal position;

Fig. 2, a side elevation of the same;

Fig. 3, a section on the line 3—3, Fig. 1;

Fig. 4, a view similar to Fig. 2, showing the testing plug operatively engaging the jacks;

Fig. 5, a side elevation of the testing plug with the upper portion of the handle broken away;

Fig. 6, a perspective view of the plug with the handle sections separated therefrom; and Fig. 7, a detached perspective view of one of the spring members of the testing jack.

Similar numerals refer to similar parts throughout the drawing.

The switch may be mounted upon a block 10 of any suitable insulation material and provided with the spaced terminals 11 and 12 to which the line wires may be connected as by the binding posts 13 and nuts 14.

The terminal 11 is electrically connected to the bracket 15 to which is pivoted, as at 16, the switch blade 17 preferably of angular shape and having a knob 18, of insulation material, upon its free end.

This switch blade is arranged to alternately engage the spring jaws 19 and 20. The jaws 19 are connected to a terminal 21 having a binding post 22 and nut 23 for connecting the same to one side of a meter and the like.

The jaws 20 are carried at the upper end of an open yoke 24 with which the blade 17 has no contact. This yoke is connected as by a bus bar 25 with the terminal 12 whereby when the switch blade 17 is in the upper position, engaging the jaws 20, the circuit is completed from the terminals 11 to 12, thus cutting out the meter or other device controlled by the switch.

A bracket 26 is electrically connected to the terminal 12 and has pivoted thereto as at 27 a switch blade 28 which may also be of angular shape and provided with a knob 29 of insulation material.

This blade is adapted to engage the jaws 30 which are electrically connected to the terminal 31 provided with a binding post 32 and nut 33 by means of which it is connected to the other side of the meter or other instrument.

The jack comprises a pair of inverted substantially V-shaped spring members 34, one of which is connected to the terminal 12 and the other to the terminal 31, the free ends of these jack springs normally contacting with each other as indicated at 35 and best shown in Fig. 2.

Each of these spring members of the jack is provided with a longitudinal slot 36 which terminates at a point spaced from the lower free end portion thereof as indicated at 37.

The testing plug comprises a pair of metal bars 38 between which is located a sheet of insulation material as shown at 39 for electrically insulating the bars from each other. These bars may be held together as by a screw 40 provided with an insulation gasket 41.

The wires 42, leading to opposite sides of the testing meter or the like, are connected to the bars 38 as by terminal clips 43 and screws 44.

These bars are carried in an insulation handle which may be formed of two halves 45 adapted to be connected together as by the screws 46.

The lower free end portions of the bars 38 protrude beyond the handle and each is provided at its lower end with an outturned angular lug 47. A similar lug 48 is stamped from each bar at a point spaced some distance above the lower end thereof, both lugs being formed in the median line of the bar.

When it is desired to test the meter or other instrument connected to the terminals 21 and 31, the switch blade 28 is first moved out of contact with the jaws 30, into the position shown in Fig. 4.

It will be seen that this does not disconnect the circuit from the line to the meter as the circuit still remains completed through the spring member 34 of the jack.

The plug is then inserted between the spring members of the jack, in the position shown in Fig. 4, the lugs 47 and 48 riding in the slots 36 to guide the plug as it is pushed into position. The lower lugs 47 will contact with the lower ends 37 of the slots, stopping the plug in the position illustrated in Fig. 4.

The spring members 34 of the jack are now separated from each other by means of the insulation strip 39 located between the bars 38 of the plug. However, the circuit to the meter or the like is not broken as the current will pass from the terminal 12 through the corresponding spring arm 34 of the jack and corresponding bar 38 of the plug out through the wire 42 attached thereto to the testing meter or the like connected thereto and then back through the other wire 42, bar 38 and spring member 34 of the jack to the terminal 31.

From this terminal the circuit goes through the meter or the like and then back to the terminal 21 and through the switch blade 17 and terminal 12 to the other side of the line.

In the event it is desired at any time to cut out the meter or other device connected to the terminals 21 and 31, it is only necessary to raise the switch blade 17 out of engagement with the jaws 19 and into engagement with the jaws 20, breaking the circuit to the meter and closing the circuit from one side of the line to the other.

This device is especially adapted for use with current transformers, in which case the transformer is connected to the terminals 13.

An indicating meter or the like is placed in series with the current coil of the electric meter by means of the testing plug. If the plug is accidentally displaced the current is instantly restored through the spring members 35 of the jack which automatically spring into contact with each other as the plug is removed. Under normal conditions no current is carried by the jack, the current being carried by the switch blade 28.

The use of this device permits series testing in current transformer secondaries without any possibility or chance of their being open circuited as the current is carried through the spring members 35 of the jack, when the switch blade 28 is opened and immediately restored through said spring members when the plug is removed, thus preventing damage to the transformer.

I claim:

1. The combination of a testing jack including two spring members normally contacting with each other, a testing plug adapted to be inserted between the spring members and comprising two conductor bars insulated from each other and having terminals for connection to a test meter and the like, each of the spring members having a longitudinal slot therein and lugs upon each of the conductor bars for engagement in said slots.

2. The combination of a testing jack including two spring members normally contacting with each other, a testing plug adapted to be inserted between the spring members and comprising two conductor bars insulated from each other and having terminals for connection to a test meter and the like, each of the spring members having a longitudinal slot therein, a lug at the lower end of each conductor bar and a second lug upon each conductor bar spaced from the first lug for engagement in said slots.

In testimony that I claim the above, I have hereunto subscribed my name.

RICHARD W. GRACE.